(12) United States Patent
Wakisaka et al.

(10) Patent No.: US 6,694,751 B2
(45) Date of Patent: Feb. 24, 2004

(54) METHOD OF CONTROL OF AIR-CONDITIONING SYSTEM DRIVEN BY VEHICLE ENGINE

(75) Inventors: Takeshi Wakisaka, Ichinomiya (JP); Yasutane Hijikata, Nagoya (JP); Kazuhito Miyagawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/305,417

(22) Filed: Nov. 27, 2002

(65) Prior Publication Data

US 2003/0131612 A1 Jul. 17, 2003

(30) Foreign Application Priority Data

Nov. 28, 2001 (JP) ........................................ 2001-363204

(51) Int. Cl.⁷ ............................. B60H 1/32; F25B 27/00
(52) U.S. Cl. ........................................ 62/133; 62/323.1
(58) Field of Search ............................... 62/133, 323.1, 62/230, 228.1, 241

(56) References Cited

U.S. PATENT DOCUMENTS 5,546,755 A * 8/1996 Krieger ........................ 62/133
6,463,749 B2 * 10/2002 Niimi ........................ 62/228.1

FOREIGN PATENT DOCUMENTS

JP  A-58-38350  3/1983

* cited by examiner

Primary Examiner—Marc Norman
(74) Attorney, Agent, or Firm—Posz & Bethards, PLC

(57) ABSTRACT

A method of control for preventing warm air from being exhausted during a fuel cut when driving an air-conditioning system by a vehicle engine comprising, when it is judged that the fuel has been cut when the engine is decelerating and the engine speed has fallen to a first judgement value, causing the amount of discharge and torque of the refrigerant compressor to fall once to for example zero or a value close to zero, then causing them to gradually rise in a pattern of torque control of the refrigerant compressor and, when it is judged that the engine speed has fallen to a second judgement value, causing the fuel cut of the engine to end so as to secure the minimum necessary cooling capacity and extend the fuel cut time simultaneously.

9 Claims, 7 Drawing Sheets

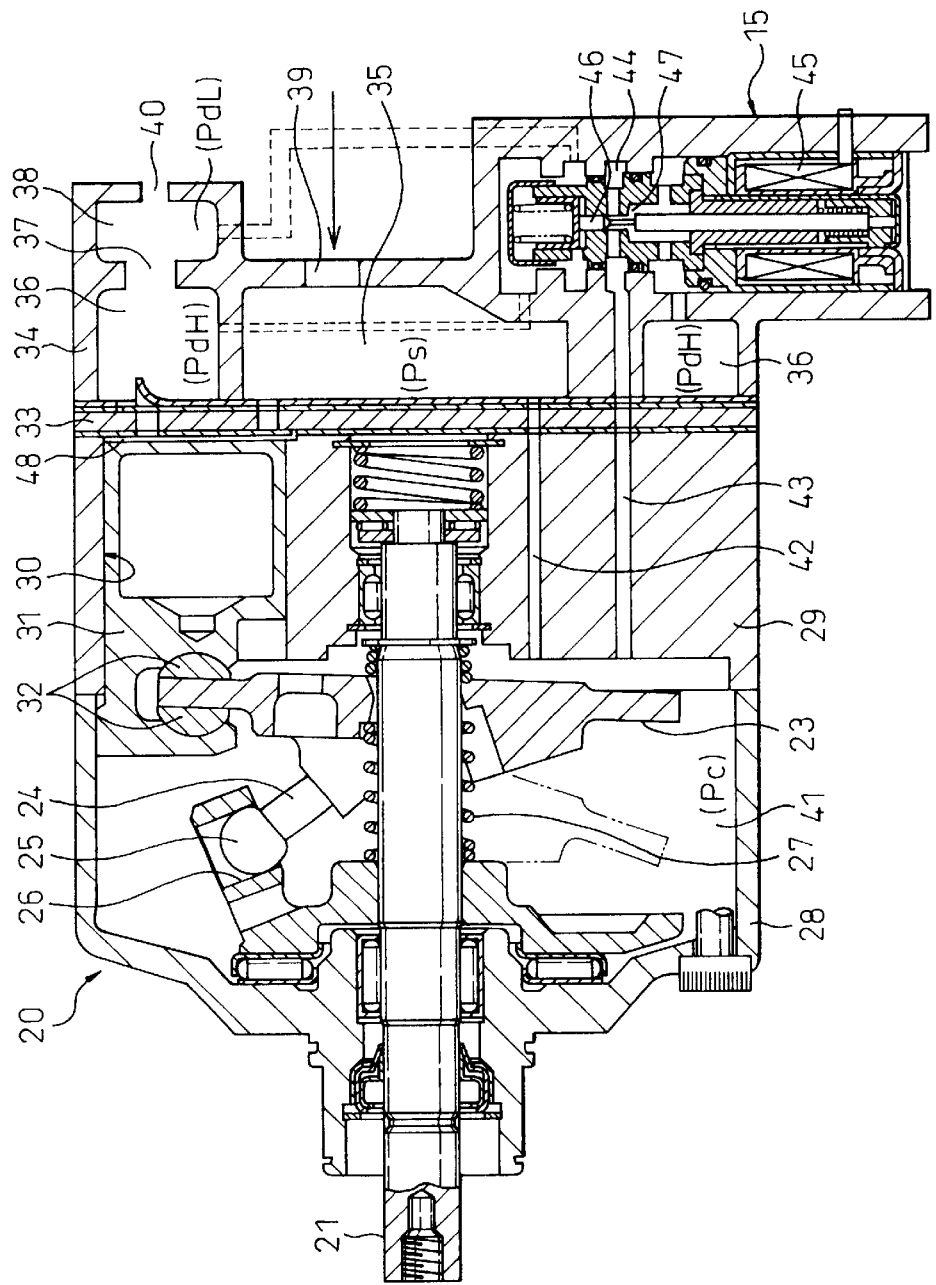

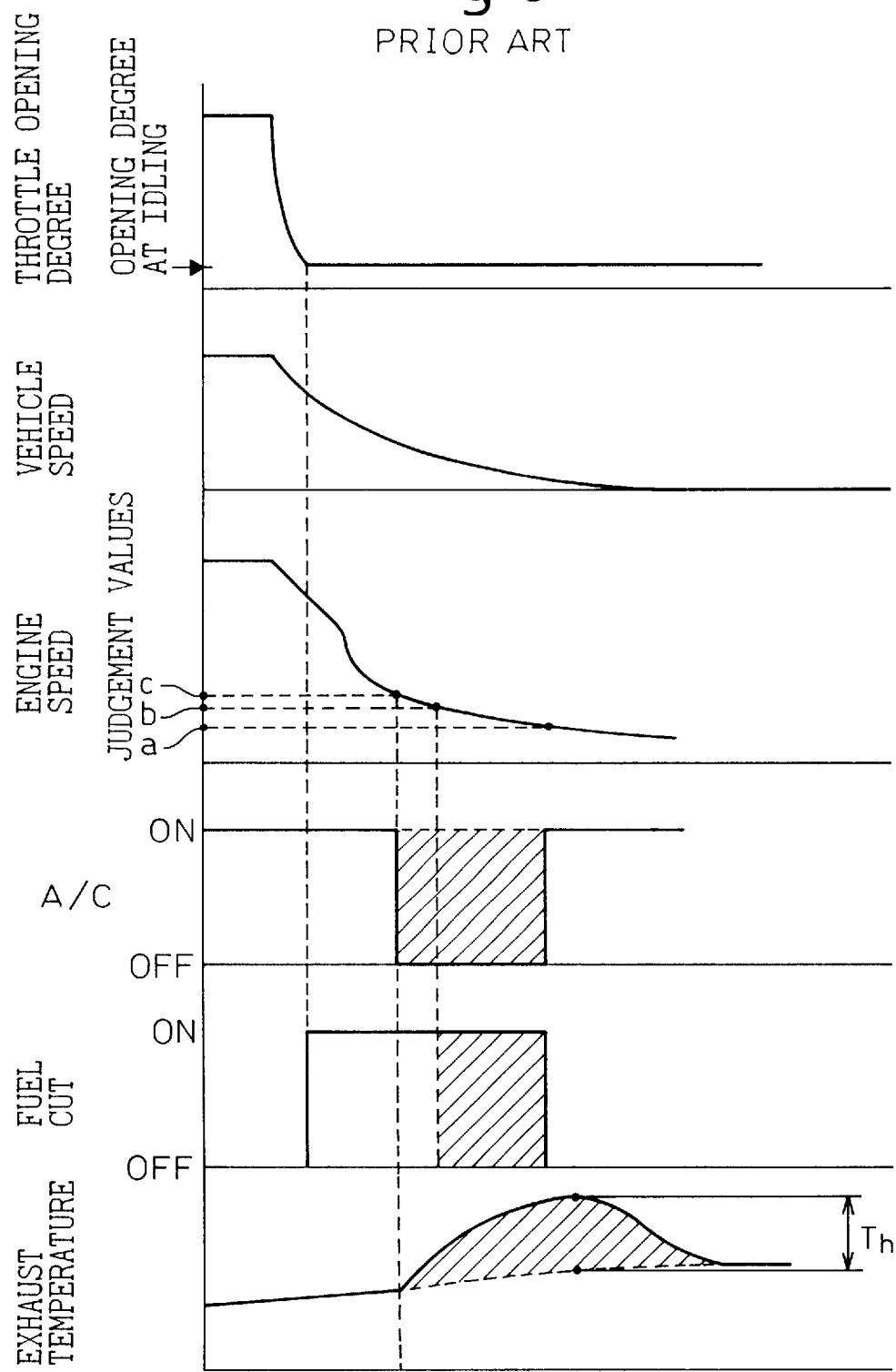

METHOD OF CONTROL OF AIR-CONDITIONING SYSTEM DRIVEN BY VEHICLE ENGINE

BACKGROUND OF THE INVENTION

1. Field of the Invention

The present invention relates to a method of control of an air-conditioning system driven by an engine mounted in a vehicle such as an automobile, more particularly relates to a method of control of a refrigerant compressor for a refrigeration cycle of an air-conditioning system etc. and an engine itself in accordance with its operating state when fuel is cut at the time an engine decelerates.

2. Description of the Related Art

As related art for comparison with the present invention, a method of controlling the operation of a compressor for an air-conditioning system of a vehicle described in Japanese Unexamined Patent Publication (Kokai) No. 58-38350 will be explained with reference to FIG. 8. According to this method of control, basically when an engine is operating at a speed greater than a predetermined fuel cut return judgement value and a throttle valve of the engine is closed to an idling opening degree, fuel starts to be cut and the supply of fuel to the engine is stopped. Due to this, when the engine speed falls and becomes lower than the fuel cut return judgement value, the fuel cut is ended and the supply of fuel to the engine is resumed.

In this case, to prevent engine stalling, it is necessary to make the fuel cut return judgement value different between the time when a clutch provided at a power transmission system between the engine and the refrigerant compressor of the air-conditioning system is disengaged (off state of air-conditioning system) and when the clutch is engaged (on state of air-conditioning system), so when designating the fuel cut return judgement value when the air-conditioning system is off as "a" and the fuel cut return judgement value when the air-conditioning system is on as "b", the fuel cut time for when the air-conditioning system is on corresponding to the return judgement value "b" is made shorter than the fuel cut time for when the air-conditioning system is off corresponding to the return judgement value "a". The difference between these is shown as a hatched area in the "FUEL CUT" section of FIG. 8.

Therefore, in this related art, even in the state of use of the air-conditioning system, when the engine speed falls to an air-conditioning cut judgement value "c" slightly higher than the return judgement value "b" for when the air-conditioning system is on after a fuel cut, the clutch of the refrigerant compressor is disengaged and the air-conditioning system is stopped so as to change the fuel cut return judgement value from the return judgement value "b" for when the air-conditioning system is on to the return judgement value "a" for when the air-conditioning system is off. When the engine speed falls to a return judgement value "a" relatively low compared with the return judgement value "b", the fuel cut is ended to resume the supply of fuel to the engine and the clutch of the refrigerant compressor is engaged to resume the operation of the air-conditioning system as well.

If the operation of the air-conditioning system were continued even during a fuel cut of the engine, it would be necessary to employ the return judgement value "b" for when the air-conditioning system is on as has been the practice in the past, so it would be necessary to shorten the fuel cut time and end the fuel cut relatively early. Compared with this, according to the above related art, the fuel cut time is increased by exactly the hatched area shown in FIG. 8. As a result, there is the advantage that the fuel cut time becomes much longer.

According to the above related art, however, while the advantage is given that the fuel cut time becomes longer, as shown by the hatched area in the "A/C" section of FIG. 8, the time when the clutch of the refrigerant compressor is disengaged and the operation of the air-conditioning system is stopped after the fuel cut becomes longer than the case where such control is not performed, so the air temperature from the air-conditioning system rises by exactly Th at the maximum as shown by the bottom section of FIG. 8, so there is the problem that uncomfortable warm air flows out into the passenger compartment at a high temperature.

SUMMARY OF THE INVENTION

An object of the present invention is to provide a novel method of control of a vehicle engine and air-conditioning system able to simultaneously satisfy the two contradictory requirements of securing the cooling capacity of the air-conditioning system and preventing the flow of uncomfortable warm air into the passenger compartment and of being able to make the engine fuel cut time as long as possible even if executing a fuel cut at an engine in the state where the air-conditioning system is being used.

According to the present invention, there is provided a method of control of an air-conditioning system driven by a vehicle engine to drive a refrigerant compressor of a refrigeration cycle comprising, when it is judged by a control device that the fuel has been cut when the vehicle engine is decelerating, then an engine speed has fallen to a predetermined first judgement value, having the control device cause the amount of discharge and the torque of the refrigerant compressor to fall once, then cause these to gradually rise in a pattern of torque control of the refrigerant compressor. In this case, when it is judged by the control device that the engine speed has fallen to a predetermined first judgement value, it is also possible to cause the amount of discharge and torque of the refrigerant compressor to fall once to zero or a value close to zero, then cause these to gradually rise. Note that in the present invention, the term "air-conditioning system" includes apparatuses having refrigeration cycles other than air-conditioning systems such as refrigerators.

According to the method of control of the present invention, when it is judged by the control device that a vehicle engine executes a fuel cut and then the engine speed falls to a predetermined first judgement value, the control device causes the amount of discharge and torque of the refrigerant compressor to fall once to for example zero or a value close to zero, then cause them to gradually rise again in a pattern of torque control of the refrigerant compressor. Therefore, since the operating time of the refrigerant compressor in the fuel cut time can be extended and the minimum required refrigeration capacity can be secured in the majority of the fuel cut time, the problem of warm air flowing into the passenger compartment during the fuel cut time is eliminated. Accordingly, it is possible to simultaneously respond to the contradictory requirements of securing a cooling capacity in the fuel cut time and extending the fuel cut time.

In the present invention, it is possible to have the control device end the fuel cut of the vehicle engine when it is judged by the control device that the engine speed has fallen to a predetermined second judgement value after torque control of the refrigerant compressor is started by the control device. The second judgement value is preferably set to a value changing in accordance with the magnitude of the torque of the refrigerant compressor. Further, it is preferable to decide one or both of the amount of drop of torque and a rate of rise of the refrigerant compressor in accordance with driving conditions of the vehicle when torque control of the refrigerant compressor is started including the engine speed, vehicle speed, outside temperature, and air flow rate of a blower of the air-conditioning system.

In the present invention, it is possible to use as the refrigerant compressor a compressor having a fixed displacement. In this case, it is necessary to drive the compressor by the vehicle engine through a transmission. As this transmission, it is preferable to use a continuous variable transmission able to continuously change the transmission ratio.

BRIEF DESCRIPTION OF THE DRAWINGS

These and other objects and features of the present invention will become clearer from the following description of the preferred embodiments given with reference to the attached drawings, wherein:

FIG. 7 is a longitudinal sectional view illustrating the structure of a swash plate type variable displacement compressor;

FIG. 8 is a time chart illustrating the states of a vehicle engine and air-conditioning system in the case of control by the related art.

DESCRIPTION OF THE PREFERRED EMBODIMENTS

A preferred embodiment of the present invention will be described in detail below while referring to the attached figures.

Figure 1:
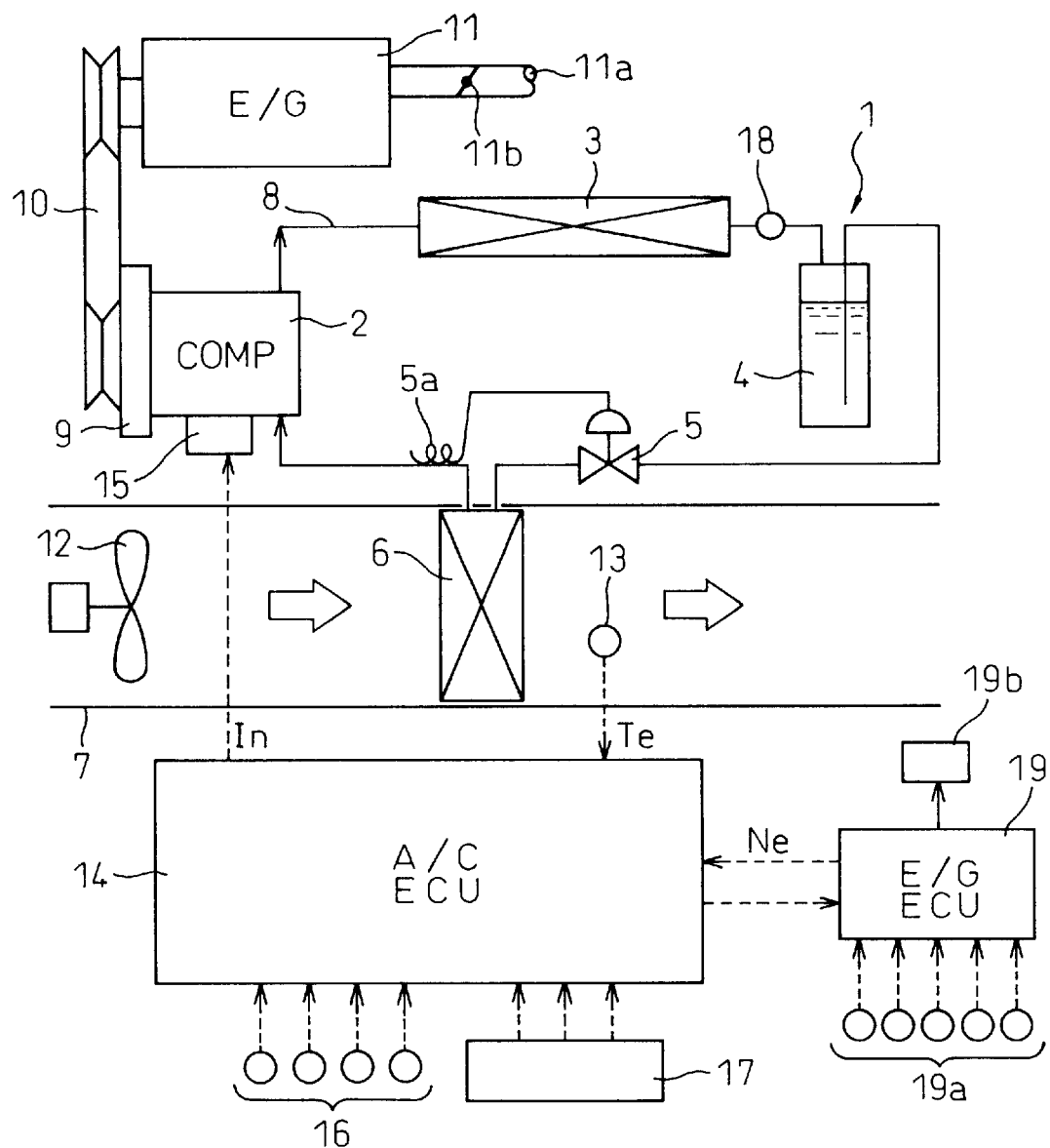
FIG. 1 is a view of the system configuration of an air-conditioning system driven by a vehicle engine.

The overall configuration of a system able to use the method of control of a vehicle engine and air-conditioning system of the present invention is illustrated in FIG. 1. The refrigeration cycle 1 of the air-conditioning system is comprised of a refrigerant compressor 2, a condenser 3, a receiver 4, an expansion valve 5, a temperature sensor 5a, an evaporator 6, piping 8, etc. A high-pressure sensor 18 is provided at the downstream side of the condenser 3.

The refrigerant compressor 2 in this embodiment is a variable displacement type. Further, it is possible to use a fixed displacement type compressor as the refrigerant compressor 2. In this case, it is sufficient to drive the fixed displacement type compressor through a continuous variable transmission or other transmission. In the illustrated embodiment, the variable displacement compressor 2 is driven through a power transmission mechanism 9 such as an electromagnetic clutch and a belt transmission system 10. The power transmission mechanism 9 may include a continuous variable transmission or other transmission. In the case of the present invention, the power source is the engine 11 mounted in the vehicle. The suction passage 11a of the engine 11 of this embodiment is provided with a throttle valve 11b. Note that the variable displacement type compressor 2 of the present embodiment is provided with an electromagnetic type capacity control valve 15. Details will be explained later.

The evaporator 6 of the refrigeration cycle 1 is arranged in an air passage 7 of the air-conditioning system. The air passage 7 is provided with a blower 12 which exhausts air as shown by the arrows. Downstream of the evaporator 6 is provided an evaporator exhaust temperature sensor 13. The air emitted from the air passage 7 flows out into the passenger compartment through a not shown heater core, passage switcher, etc.

The capacity control valve 15 of the variable displacement type compressor 2 is controlled by the provision of an air-conditioning control device 14. The air-conditioning control device 14 generates a pulse current in for control, which it supplies to the capacity control valve 15. Therefore, an evaporator exhaust temperature signal Te is input from the evaporator exhaust temperature sensor 13 to the air-conditioning control device 14. In addition, the air-conditioning control device 14 receives as input the signals detected by a large number of sensors 16 such as an inside air temperature sensor, outside air temperature sensor, sunlight sensor, and engine cooling water temperature sensor and signals from switches provided at the control panel 17 of the air-conditioning system such as a temperature setting switch, flow rate switch, exhaust mode switch, inside/outside air switch, and A/C switch for emitting operating instructions of the refrigerant compressor 2.

The engine 11 is provided with an engine control device 19 for controlling it. The engine control device 19 receives as input signals from a large number of sensors 19a provided for detecting the operating state of the engine 11. The results of the computation, that is, the control signals, are supplied to several actuators 19 for control of the engine 11. The engine control device 19 and the air-conditioning control device 14 also transfer signals such as for example the engine speed signal Ne between them. Note that the air-conditioning control device 14 and engine control device 19 need not be combined as a single unit.

Next, the operations of the air-conditioning control device 14 and engine control device 19 when controlling the system shown in FIG. 1 by the method of control of the present invention will be explained in more detail by the routine for control illustrated in the flow chart of FIG. 2, the time chart illustrated in FIG. 3, the control maps illustrated in FIG. 4 to FIG. 6, etc.

Figure 2:
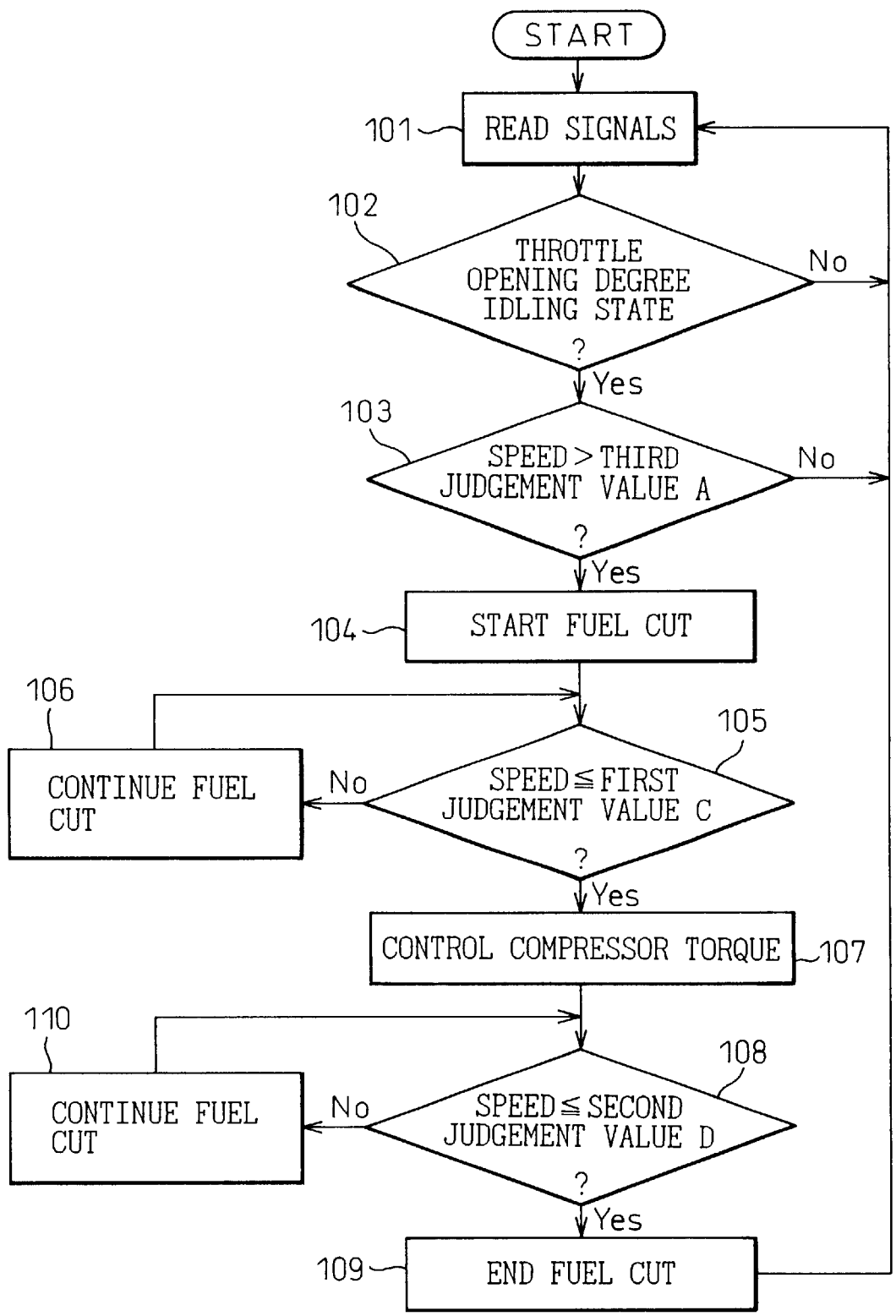
FIG. 2 is a flow chart of the routine of control of the present invention.

When the engine 11 is started, at step 101 in the flow chart shown in FIG. 2, information on the operating state of the vehicle is read from the various types of sensors attached to the vehicle into the air-conditioning control device 14 and electronic control unit (ECU) in the engine control device 14. At the next step 102, it is judged if the opening degree of the throttle valve 11b opening and closing the suction passage 11a of the engine 11 is in the opening degree of the idling state. Needless to say, when an idling speed control valve (ISCV) is provided in parallel to the throttle valve 11b, the opening degree of the throttle valve lib in the idling state is zero, so at that step, it is judged if the throttle valve 11b is in the fully closed state. If NO, the routine returns to step 101.

When it is judged YES at step 102, the routine proceeds to step 103, where it is judged if the engine speed Ne is larger than a predetermined fuel cut judgement value A (third judgement value). If the judgement is YES, at step 104, the fuel cut to the engine 11 is started. If NO, the routine returns to step 101. At the judgement at step 105 after the start of the fuel cut, a value C larger than the fuel cut return judgement value B for when the air-conditioning system is on is set as the air-conditioning cut judgement value and it is judged if the engine speed has become less than the air-conditioning cut judgement value C. If the judgement is NO, at step 106, the fuel cut is continued, while if YES, the routine proceeds to step 107 where the torque of the refrigerant compressor 2 is controlled by the map shown in FIG. 4.

First, to prevent a drop in the engine speed, the torque (compressor torque) acting on the shaft of the refrigerant compressor 2 is lowered to a value close to zero once. When the power transmission mechanism 9 includes an electromagnetic clutch etc., it is sufficient to disengage this, but in the case of the illustrated embodiment, the refrigerant compressor 2 is a variable displacement type compressor, so the displacement can be adjusted to become substantially zero. After the compressor torque becomes substantially zero, the displacement of the refrigerant compressor 2 is then gradually increased so as to gradually increase the compressor torque. Due to this, by recirculating the refrigerant a little at a time in the refrigerant cycle 1, the rise in the exhaust temperature of the cool air from the evaporator 6 detected by the evaporator exhaust temperature sensor 13 can be suppressed and warm air can be prevented from being exhausted into the passenger compartment.

Figure 3:
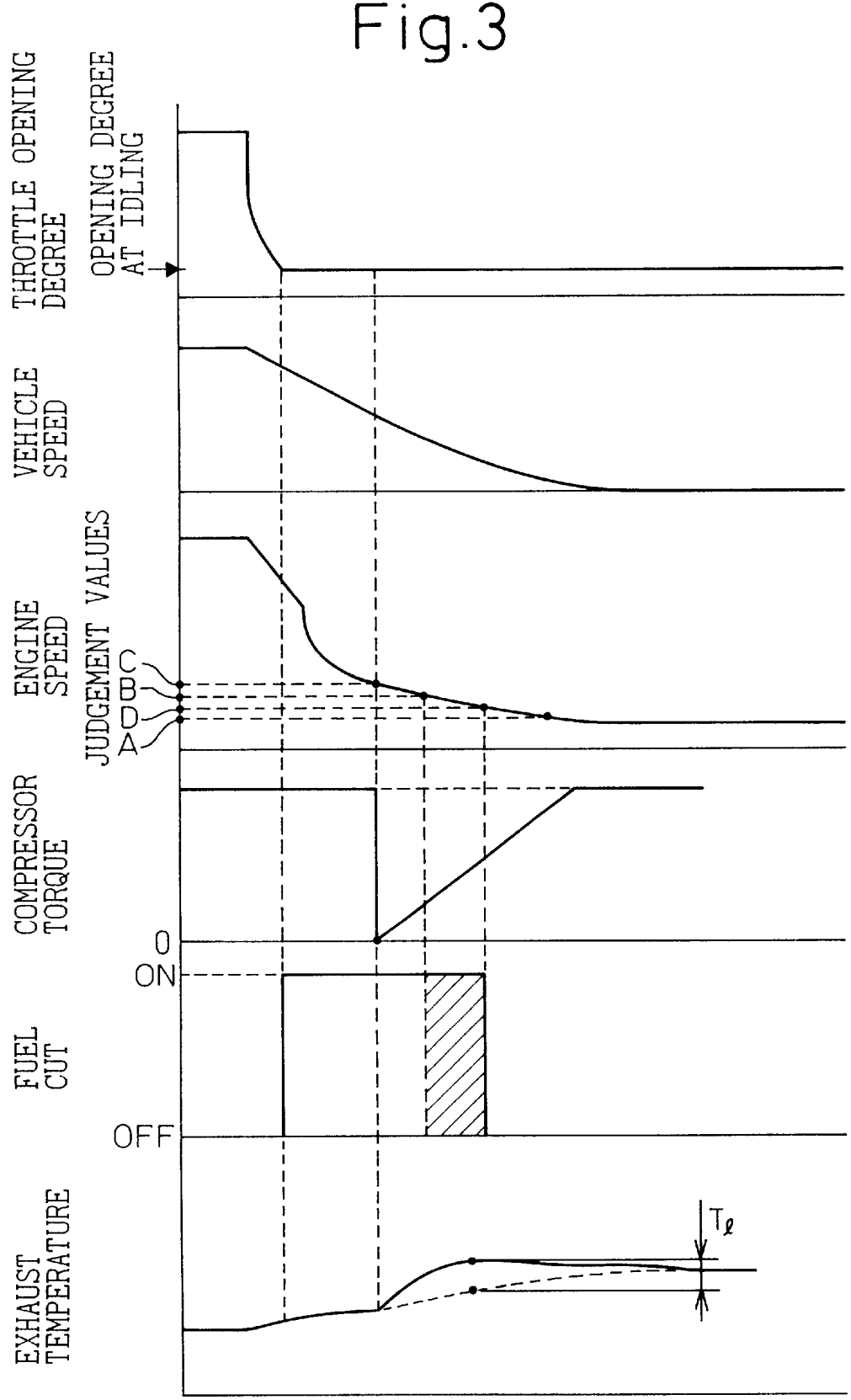
FIG. 3 is a time chart illustrating the states of the vehicle engine and air-conditioning system in the case of control by the present invention.
Figure 4:
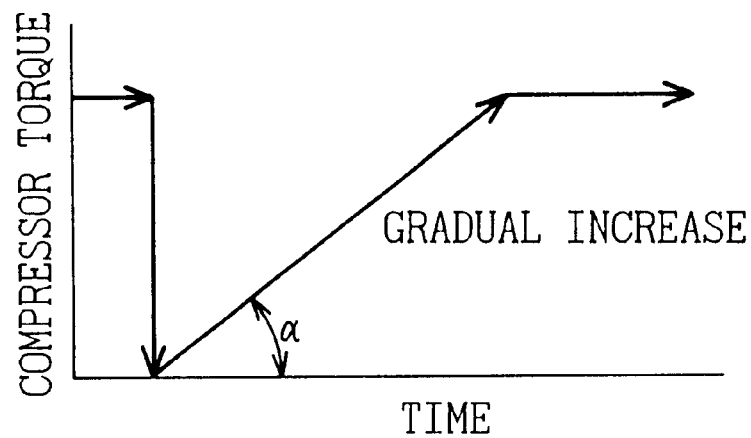
FIG. 4 is a graph illustrating the pattern of torque control of a compressor according to the present invention.
Figure 5:
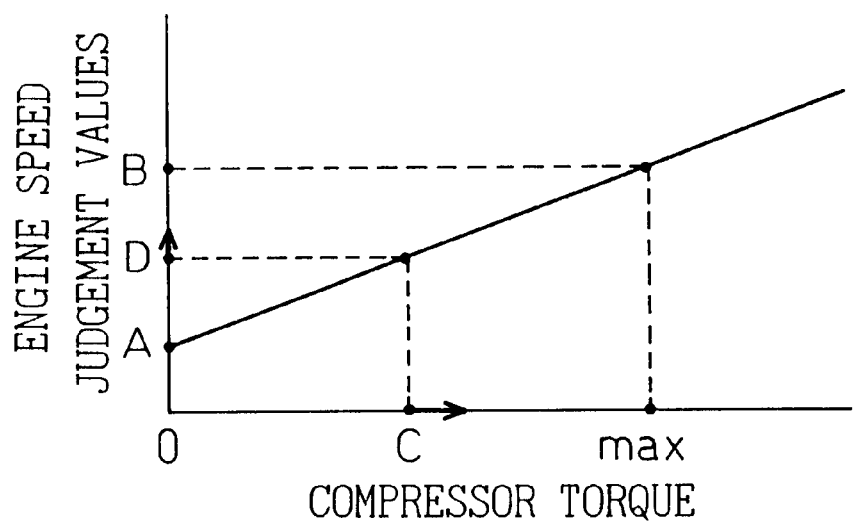
FIG. 5 is a graph illustrating a method of determining a third judgement value of control according to the present invention.

At this time, since the engine speed falls as shown in FIG. 3 along with an increase in the compressor torque, if falling excessively, the engine will stall, so the fuel cut return judgement value D (second judgement value) is set in the map as a variable value as shown in FIG. 5. The fuel cut return judgement value D in this case can for example be set by making the minimum value the same value as the return judgement value A for when the air-conditioning system is off (third judgement value) and making the maximum value the same value as the return judgement value B for when the air-conditioning system is on so as to continuously change in accordance with the magnitude of the compressor torque between them.

Further, at step 108, when it judged that the engine speed has fallen below the fuel cut return judgement value D (second judgement value) corresponding to the compressor torque at that time, the routine returns to step 109, where the fuel cut is ended and the supply of fuel to the engine 11 is resumed, so the routine returns to step 101 and the above-mentioned control is repeated. Up until then, the fuel cut is continued at step 110.

Figure 6:
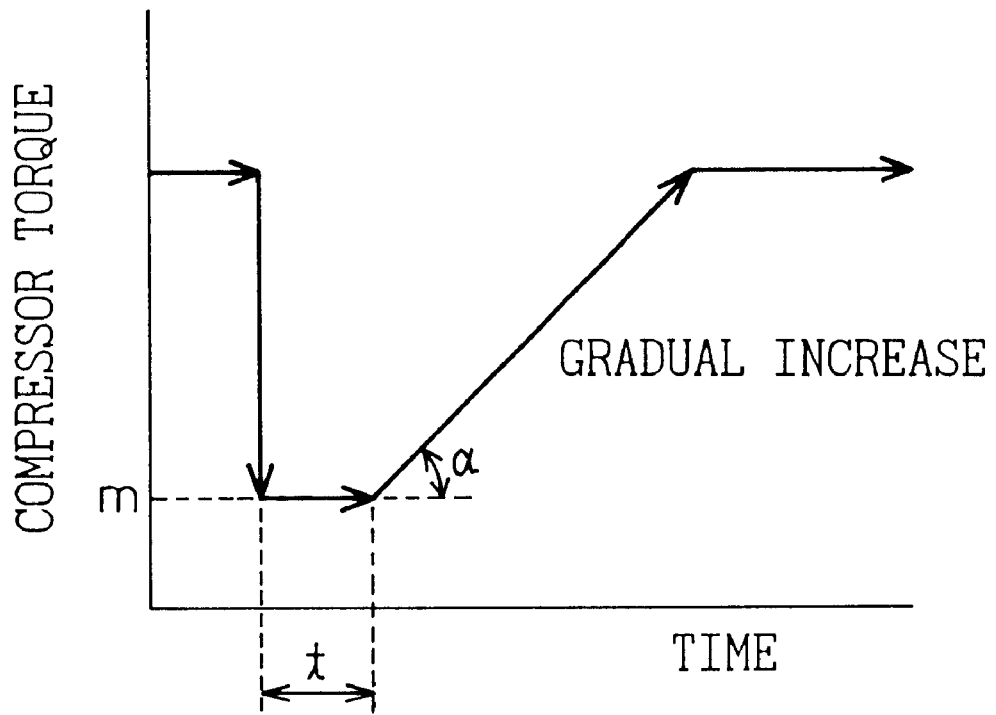
FIG. 6 is a graph illustrating another pattern of torque control of the compressor according to the present invention.

Note that instead of the control pattern of the compressor torque shown in FIG. 4, the torque of the swash plate compressor 20 when the engine speed falls below the air-conditioning cut judgement value C (first judgement value) is controlled by deciding on the minimum value m of the torque larger than zero, the standby time t until the start of increase of the displacement, the increased acceleration (gradient) α of the torque, and other necessary factors from the detection values of the sensors showing the states of the refrigeration cycle 1 and vehicle (engine speed, vehicle speed, outside air temperature, flow rate of blower 12, etc.) so as to control the system as shown in FIG. 6. That is, in this example, as in the above example, the displacement is not made zero once but the fall stopped at the minimum value m and compressor torque is held at the minimum value m for exactly the time t, then increased at a speed of the gradient α.

In this way, in the control at the time of deceleration of the engine or the vehicle, by reducing the torque of the refrigerant compressor of the air-conditioning system so as to extend the fuel cut time and using this to prevent the cooling capacity from dropping too much, it is possible to control the refrigerant compressor so that the displacement is gradually increased and thereby keep the rise in the exhaust temperature to the extent of T1 shown in FIG. 2 even at the maximum and extend the fuel cut time as shown by the hatching in FIG. 3, so it is possible to simultaneously satisfy the contradictory requirements of the improvement of the fuel economy and securing the cooling capacity.

The compressor torque required when executing the method of control of the present invention may be controlled by using a variable displacement type compressor as the refrigerant compressor or, when using a fixed displacement type compressor, driving this through a transmission such as a continuous variable transmission. As one example of a variable displacement type compressor, the case of use of the swash plate type variable displacement compressor 20 shown in FIG. 7 as the refrigerant compressor 2 shown in FIG. 1 will be briefly explained. In FIG. 7, reference numeral 21 is a shaft, which is driven to rotate by the engine 11 through the belt transmission system 10 etc. such as shown in FIG. 1. The power transmission mechanism 9 may include an electromagnetic clutch or may be a constant power transmission type clutchless mechanism not having a clutch mechanism.

The shaft 21 has a swash plate guide 22 attached to it. The disk-shaped swash plate 23 is inserted over the shaft 21 by a center hole and not fixed, so it is possible to freely tilt it with respect to the shaft 21. The swash plate 23 has an arm 24 provided integrally with it. The spherical front end 25 is engaged with a cam hole 26 formed at part of the swash plate guide 22. The swash plate 23 is constantly pushed in the axial direction toward the right in the figure by a coil spring 27 on the shaft 21. Due to this, the swash plate 23 is constantly biased in a direction giving a smaller tilt angle (angle with respect to imaginary plane perpendicularly intersecting the shaft 21).

The cylinder block 29 forming the housing 28 of the swash plate type compressor 20 has for example five cylinder bores 30 formed in parallel with the shaft 21 equally around the shaft 21. These cylinder bores 30 have pistons 31 inserted into them. The left ends of these pistons 31 are engaged to be able to slide with respect to the periphery of the swash plate 23 and allowing tilt of the swash plate 23 through abrasion reducing means such as shoes 32.

The cylinder block 29 has a valve plate 33 and rear housing 34 attached to it integrally by means such as not shown bolts. Part of the rear housing 34 has attached to it an electromagnetic type capacity control valve 15 contacting it. The center of the rear housing 34 is formed with a suction chamber 35. Around it is formed a first discharge chamber 36. The first discharge chamber 36 is communicated with a second discharge chamber 38 through a constricted passage 37.

A suction port 39 provided at the suction chamber 35 is connected to an evaporator 6 at the above-mentioned refrigeration cycle 1 and receives low temperature, low pressure refrigerant. The discharge port 40 provided at the second discharge chamber 38 is connected to the above-mentioned condenser 3 so that high temperature, high pressure refrigerant is sent out to the condenser 3. Therefore, the lowest suction pressure Ps acts on the suction chamber 35, the highest pressure discharge pressure PdH acts on the first discharge chamber 36, and a discharge pressure PdL slightly reduced from the discharge pressure PdH acts on the second discharge chamber 38.

The swash plate chamber 41 housing the swash plate 23 is communicated with the suction chamber 35 through the constricted passage 42 and is communicated with the control pressure chamber 44 of the capacity control valve 15 through the passage 43. While a detailed explanation will be omitted, when the solenoid 45 is electrically biased and the valve rod 46 moves in the vertical direction, the magnitude of the valve opening 47 changes, whereby part of the refrigerant of the discharge pressure Pd is reduced in pressure and is sent into the swash plate chamber 41 through the passage 43, so the inside of the swash plate chamber 41 is given a control pressure Pc of any level between the discharge pressure PdH and suction pressure Ps.

Therefore, as shown in FIG. 1, when changing the duty ratio of the pulse-like control current In supplied from the air-conditioning control device 14 to the electromagnetic capacity control valve 15 of the refrigerant compressor 2 (in this case, the swash plate compressor 20) and changing the amount of current supplied to the solenoid 45, it is possible to freely change the magnitude of the control pressure Pc in the swash plate chamber 41.

Note that since the valve rod 46 of the capacity control valve 15 is acted on not only by the electromagnetic biasing force of the solenoid 45, but also the biasing force due to the differential pressure between the high discharge pressure PdH of the first discharge chamber 36 and the slightly lowered discharge pressure PdL of the second discharge chamber 38, the resultant force causes the valve rod 46 to move in the vertical direction. The differential pressure in this case corresponds to the flow rate of the refrigerant passing through the constricted passage 37, that is, the amount of discharge of the swash plate type compressor 20, so acts to give feedback control so as to make the amount of discharge automatically match with a command value.

Since the swash plate type variable displacement type compressor 20 shown in FIG. 7 is configured as explained above, when the shaft 21 is driven to rotate by the engine 11 in the operating state of the air-conditioning system, the piston 31 moves reciprocatively in the axial direction in a stroke determined in accordance with the tilt angle of the swash plate 23 to suck low pressure refrigerant of the suction chamber 35 into the working chamber 48 and compress and discharge the high-pressure refrigerant to the first discharge chamber 36.

At this time, the swash plate 23 moves on the shaft 21 until the compression reaction force acting on the piston 31 due to the compression of the refrigerant in the working chamber 48, the force due to the back pressure acting on the piston 31 due to the control pressure Ps in the swash plate chamber 41, the biasing force of the related coil spring 27 etc., and other forces balance. The arm 24 of the swash plate 23 engages with the cam hole 26 of the swash plate guide 22 by the spherical front end 25, so when the swash plate 23 moves in the axial direction, the tilt angle of the swash plate 23 changes continuously as illustrated by the dotted line in FIG. 7. Due to this, the stroke of the piston 31 is changed continuously, it is possible to change the control pressure Pc of the swash plate chamber 41 by operation of the air-conditioning control device 14 so as to freely change the displacement of the swash plate compressor 20 between zero and the maximum value.

The magnitude of the torque acting on the shaft 21 of the swash plate compressor 20 can be detected by for example providing a torque measuring means at a portion from the power transmission mechanism 9 to the shaft 21. In this embodiment, it is possible to calculate the torque from the detection value of a high-pressure sensor 18 provided in the refrigeration cycle 1 and the speed Ne of the engine 11 obtained from the engine control device 19 in addition to the control current In supplied to the solenoid 45.

Note that, opposite to this, when calculating the target value of the control current In, it is possible to compute this from the target value of the torque, the speed Ne of the engine 11, and the pressure value detected by the high-pressure sensor 18. It is possible to use the control current value calculated by this to control the swash plate compressor 20 so that the torque of the shaft 21 matches with the target value.

Further, when using a fixed displacement type compressor as the refrigerant compressor 2, it is sufficient to use a transmission such as a continuous variable transmission as the power transmission mechanism. In this case, by changing the ratio between the input speed and the output speed of the continuous variable transmission, that is, the transmission ratio, it is possible to freely change the amount of discharge of the refrigerant compressor 2 and the magnitude of the torque driving the refrigerant compressor 2. Therefore, in this case as well, it is possible to obtain effects similar to those of the above embodiment.

While the invention has been described with reference to specific embodiments chosen for purpose of illustration, it should be apparent that numerous modifications could be made thereto by those skilled in the art without departing from the basic concept and scope of the invention.

We claim:

1. A method of control of an air-conditioning system driven by a vehicle engine to drive a refrigerant compressor of a refrigeration cycle comprising, when it is judged by a control device that fuel has been cut when said vehicle engine is decelerating, then when engine speed has fallen to a predetermined first judgement value, having said control device cause the amount of discharge and the torque of said refrigerant compressor to fall once, then cause these to gradually rise in a pattern of torque control of the refrigerant compressor so as to secure a minimum refrigeration capacity and extend the fuel cut time simultaneously.

2. A method of control of an air-conditioning system as set forth in claim 1, further comprising having said control device cause the amount of discharge and torque of said refrigerant compressor fall once to zero or a value close to zero, then cause these to gradually rise when it is judged by said control device that the engine speed has fallen to a predetermined first judgement value.

3. A method of control of an air-conditioning system as set forth in claim 1, further comprising having said control device end the fuel cut of said vehicular engine when it is judged by said control device that the engine speed has fallen to a predetermined second judgement value after torque control of said refrigerant compressor is started by said control device.

4. A method of control of an air-conditioning system as set forth in claim 3, further comprising setting said second judgement value as a value changing in accordance with the magnitude of the torque of said refrigerant compressor.

5. A method of control of an air-conditioning system as set forth in claim 1, further comprising deciding one or both of the amount of drop of torque and a rate of rise of said refrigerant compressor in accordance with driving conditions of the vehicle when torque control of said refrigerant compressor is started including the engine speed, vehicle speed, outside temperature, and flow rate of a blower of the air-conditioning system.

6. A method of control of an air-conditioning system as set forth in claim 1, wherein said refrigerant compressor is a variable displacement compressor.

7. A method of control of an air-conditioning system as set forth in claim 6, wherein said refrigerant compressor is a swash plate type variable displacement compressor.

8. A method of control of an air-conditioning system as set forth in claim 1, wherein said refrigerant compressor is a fixed displacement compressor and is driven by said vehicular engine through a transmission.

9. A method of control of an air-conditioning system as set forth in claim 8, wherein said transmission is a continuous variable transmission able to continuously change a transmission ratio.

* * * * *